L. L. BROOKS.
AUTOMOBILE TIRE INFLATING MECHANISM.
APPLICATION FILED JULY 26, 1911.
1,072,907.
Patented Sept. 9, 1913.
2 SHEETS—SHEET 1.
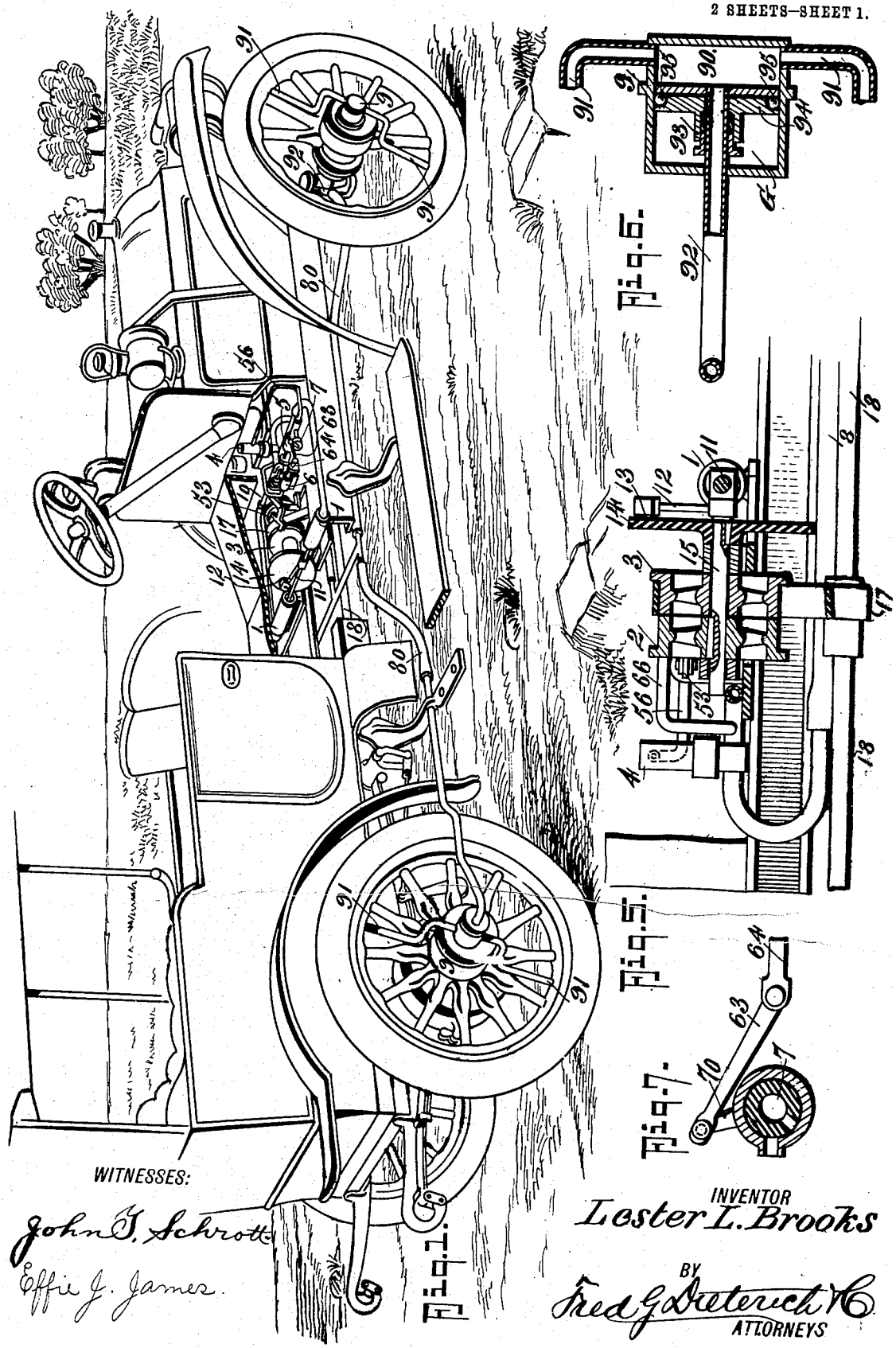
WITNESSES:
John T. Schrott
Effie J. James
INVENTOR
Lester L. Brooks
BY
Fred G. Dieterich
ATTORNEYS

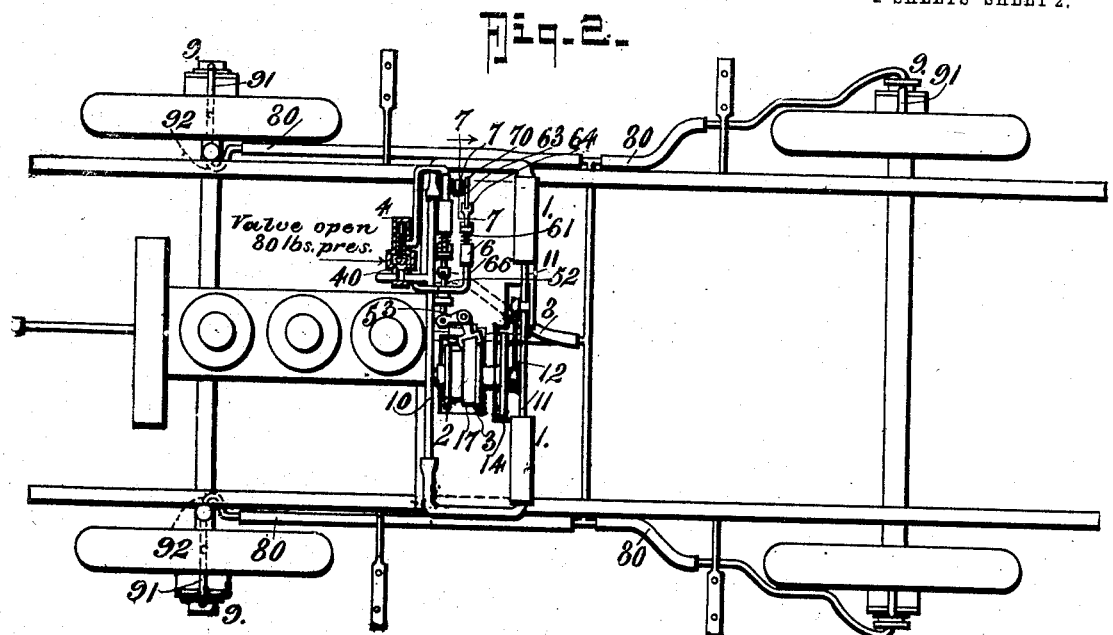
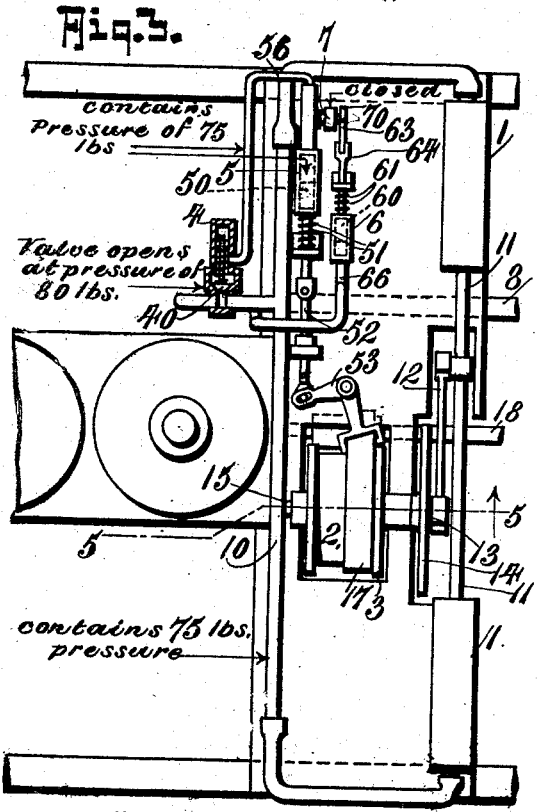
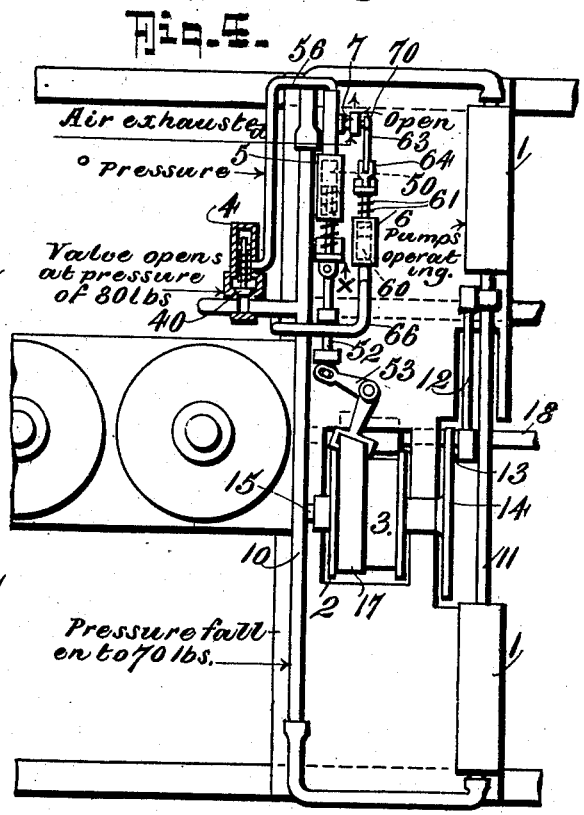

UNITED STATES PATENT OFFICE.

LESTER L. BROOKS, OF FALLS CITY, OREGON.

AUTOMOBILE TIRE-INFLATING MECHANISM.

1,072,907.  Specification of Letters Patent.  Patented Sept. 9, 1913.

Application filed July 26, 1911. Serial No. 640,661.

*To all whom it may concern:*

Be it known that I, LESTER L. BROOKS, residing at Falls City, in the county of Polk and State of Oregon, have invented a new and Improved Automobile Tire-Inflating Mechanism, of which the following is a specification.

My invention, which generally relates to means whereby pneumatic tires for motor vehicles are automatically inflated, while the vehicle is in motion, more particularly has for its purpose to provide a practical, compact and economically constructed means of the character stated that can be readily applied to any of the well known types of motor vehicles without materially altering their standard arrangement of parts.

In its generic nature my invention embodies an improved arrangement of pumping devices driven from the motor engine and coupled with the wheel tires, a shifting means automatically controlled by varying air pressures in supplemental air cylinders, and in the tires for throwing the pumping means into and out of action, as the tire conditions may determine.

In its more subordinate features, my invention consists in the novel construction and coöperative arrangement of the parts hereinafter fully described, specifically pointed out in the appended claims, and illustrated in the accompanying drawings, in which:—

Figure 1, is a perspective view of a motor vehicle and illustrates the practical application of my improved tire inflating mechanism. Fig. 2, is a diagrammatic plan view that shows the relation of the parts constituting my improved mechanism when the pressure in the tires is normal. Fig. 3, is a similar view, the parts being in a position assumed when the pressure in any of the tires is slightly below the normal. Fig. 4, is a similar view, the parts being in the tire inflating or pumping-up position. Fig. 5, is a detail longitudinal section on the line 5—5 on Fig. 3. Fig. 6, is an enlarged section of one of the air-tight hub connections for the front wheels as hereinafter referred to. Fig. 7, is a detail cross section of the blow-off cock on the line 7—7 of Fig. 2.

In the practical application of my invention the pumping mechanism and the controlling means for shifting the pump into and out of action are suitably mounted on the motor vehicle frame for being coupled with the engine driven shaft, and preferably at the forward end where the auto driving mechanism is located, as shown in Fig. 1 of the drawings.

My improved mechanism in its complete form includes two pumping cylinders 1 arranged one at each side of the body of the vehicle, and these are in communication, through the coupling or air pressure pipe 10.

11 designates the single piston rod that coöperates with the two pump cylinders and pistons contained therein and which is reciprocated, at times, through the link 12, that joins with the wrist pin 13 in the crank disk 14 mounted on a pump driving shaft 15 that carries a fast pulley 2 and a loose pulley 3.

17 designates a driven belt that takes over the engine drive shaft 18 and the pulleys 2 and 3.

4 designates a safety or controlling valve in direct connection with the air pipe or duct 10 and which is set to open at a predetermined pressure of the air within the said pipe, the said indicated pressure, in the present case being eighty pounds, it being understood that the air, through said valve, flows off under eighty pounds pressure.

5 designates an air-cylinder, hereinafter termed the "stop cylinder" and the said cylinder is in communication with the controlling valve 4, at a point back of the valve member 40.

50 designates a piston within the cylinder 5 that is held back, that is,—shifted in one direction, by a spring 51 and is moved in the other direction, under air pressure against it in excess of the spring pressure, and the said piston has its rod 52 coupled to a crank lever or arm 53 that engages the drive belt 17, and shifts it, on or off, the driving pulley 2, it being understood that the belt shifter movement is controlled by the varying air pressures incident in the falling of the pressures in the tires below normal, by puncture or leakage and by the restored air pressure under pumping action.

6 designates another cylinder hereinafter termed "starting cylinder," located adjacent the "stopping cylinder" and the said cylinder contains a piston 60 movable in one direction under the tension of a spring 61 and in the other direction under air pressure in excess of the spring pressure.

7 designates a blow-out cock in the pipe lead 56 that joins the stop cylinder with the controlling valve and the cock has a crank member 70 that is coupled to a link 63 connected to the piston rod 64 for the cylinder 6.

66 designates a pipe that connects the cylinder 6 with the main pipe 10 at a point in advance of the controlling valve.

8 designates a feed pipe that couples with the main air duct or pipe 10 and leads the air to all of the wheels, and in practice the several branch pipes 80, where they lead to the front wheels, are flexible to compensate for the changing positions of the parts without breaking the air connections.

My improved mechanism in its complete form also includes an improved air connection with the several wheels for leading the air to the tires. One of these connections is shown in detail in Fig. 6 and the same consists of a hub 9 that has an air chamber 90 having branches 91 that lead the air to the tires.

92 designates one of the main line pipes that extends into the hub (the outer end for the front wheels and the inner end for the rear wheels) passes through a stuffing box 93 and through a disk 94 that forms one wall of the air chamber.

94 designates a ball bearing run for the stuffing box to facilitate the easy running of the wheel without disturbing the air tight connections.

Part G of the hub forms a casing around the stuffing box to keep out dirt and dust.

The operation is best explained as follows; reference being particularly made to Figs. 2, 3 and 4 of the drawings.

Fig. 2 shows the normal position of the parts with the tires under the normal, eighty pounds pressure. When the air pressure in one or more of the tires falls to, say seventy-five pounds, the spring pressure on the controlling valve member 40, closes the said valve, see Fig. 3 and thereby retains seventy-five pounds pressure on the piston of the stopping cylinder 5 and in the pipe that joins the said cylinder with the controlling or safety valve 4. Now, when the air pressure in the tires has fallen to seventy pounds, the tension of the spring on the piston rod of the "starting cylinder" 6 shifts the said piston rod and opens the blow-out cock 7 for the stopping cylinder 5 which reduces the air pressure in the said cylinder and thereby allows the spring tension on the piston of said cylinder to move the piston in the direction of the arrow $x$, see Fig. 4, and thereby cause the bell crank lever to shift the belt from the loose pulley 3 onto the fast pulley 2, which starts the pumps. The air is now restored to the normal seventy-five pounds pressure in the tires and when that pressure is reached the blow-out cock 7 closes, since the flow is through the pipe from the main line to the cylinder 6, and against the piston contained therein. When the pressure goes to say, eighty pounds the safety controlling valve 4 opens and the air goes through it to the "stop cylinder" 5 and forces the piston therein out to move the bell crank lever to shift the belt back onto the loose pulley 3.

By reason of the peculiar arrangement of the parts, as described and shown, the operation of keeping the tires inflated, while traveling and so long as their punctures are not beyond the capacity of the pump, is entirely automatic, with the pumping action started and stopped whenever needed and maintained only for the time necessary to restore the normal or desired pressure for the tires.

What I claim is:

1. In a tire inflating means, an air pump, a power plant, a main air duct, a supplemental air duct, a controlling valve connection between the main and supplemental air ducts closed under an initial fall of the pressure in the main air duct and thereby holding the normal air pressure in the supplemental air duct, a stopping cylinder in communication with the supplemental air duct, a stopping piston in the stopping cylinder spring held against the air pressure thereon, a starting cylinder in communication with the main air duct, a spring held starting piston in the starting cylinder, a blow-off valve in the supplemental air duct connected to the starting cylinder and movable to its open position by the spring tension thereon to reduce the pressure in the supplemental air duct when the pressure in the main air duct goes below a predetermined reduction whereby to allow the controlling valve for the supplemental air duct to shift to again open up communication between the main and the supplemental air ducts.

2. A power plant, said plant including a driving belt and a shifter for the said belt, a pumping engine coöperatively connected with the driving belt, a belt shifting means that includes a shifting cylinder and a piston, a main air duct, a supplemental duct connecting the said main air duct with the shifting cylinder, a back check valve and a blow-off valve in the said supplemental air duct, and an air pressure controlled device connected with the said blow-off valve for opening and closing the same, the said last named device including a second cylinder in communication with the main air duct, a piston operating in the said second cylinder and connected with the said blow-off valve.

LESTER L. BROOKS.

Witnesses:
R. VAN DEN BOSCH,
WM. ESTELLE.